May 16, 1933.  A. LESPÉRANCE  1,909,872

PORTABLE PASTEURIZER FOR MILK

Original Filed Feb. 3, 1930

Inventor
A. Lespérance
By
Attorney.

Patented May 16, 1933

1,909,872

UNITED STATES PATENT OFFICE

ALEXANDRE LESPÉRANCE, OF MONTREAL, QUEBEC, CANADA

PORTABLE PASTEURIZER FOR MILK

Application filed February 3, 1930, Serial No. 425,596. Renewed April 7, 1933.

The present invention relates to improvements in portable pasteurizers for milk, and the main object of this invention is to provide a milk pasteurizing device which is portable and particularly adapted for treating small quantities of milk and of simple construction and easy to operate. A further object is to provide a device which may be treated on an ordinary stove and is most suitable for the home pasteurizing of the milk.

The invention principally consists of a main circular water recipient, in which fits a circular milk recipient, of suitable size, which projects therein to a suitable distance from the bottom of the main water recipient, and is of such a diameter in relation to said main recipient, as to leave a water space therearound.

In the center of said milk recipient is provided a tubular member of suitable size which extends vertically throughout said recipient so as to provide a central water column, in order to evenly heat the milk. This feature is most important and essential for the correct function of the apparatus. It is most important to evenly heat the milk throughout, and in that respect, it is a well known principle, that to heat rapidly and evenly any fluid or cool same, it is desirable to increase the heating surface. That is exactly the reason for providing this central water column. A suitable cover is provided for the milk recipient and one or more thermometers are provided to indicate when the correct pasteurizing temperature of 142° to 145° or more, has been attained. When this temperature has been obtained, it is necessary to cool the milk, and this is done by filling the central water column with cold water, with the result that the hot water will flow through a suitable outlet provided in the outer wall of the main recipient.

In the accompanying drawing:—

Like numerals of reference indicate corresponding parts in each figure.

Figure 1:
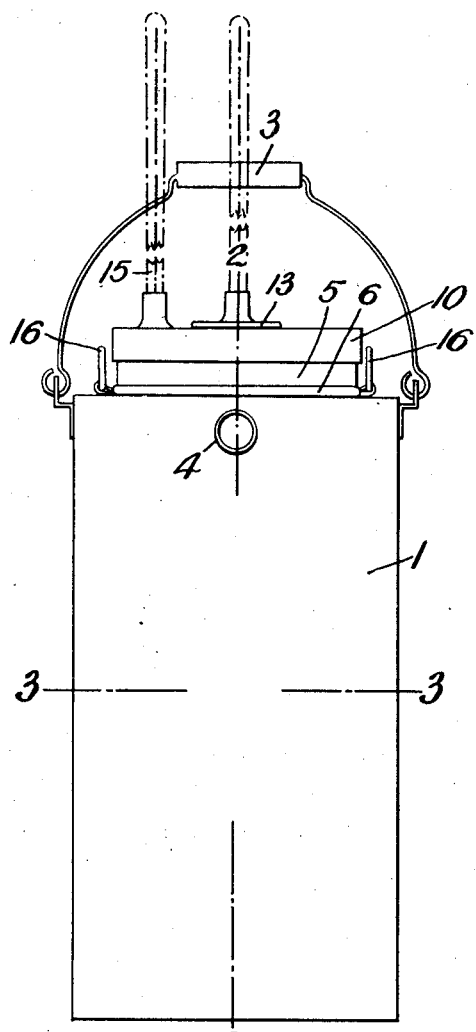
Figure 1 is a side elevation view of the apparatus.
Figure 2:
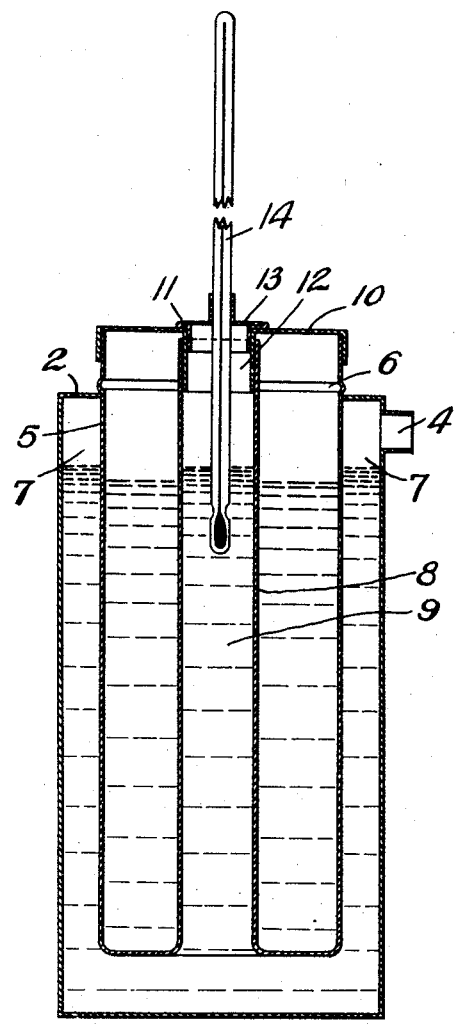
Figure 2 is a vertical section therethrough on line 2—2 of Figure 1.
Figure 3:
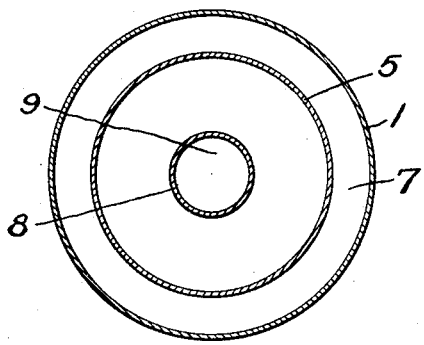
Figure 3 is a cross section on line 3—3 of Figure 1.

Referring to the drawing, 1 is a main circular recipient, preferably having the inturned upper edge 2 extending slightly inwardly at the top thereof and 3 is a suitable handle. Adjacent the upper edge of said recipient may be provided an outlet opening 4. Within said main recipient is provided the milk recipient 5 which is of smaller diameter, said recipient having suitable means, such as the circumferential embossment or rib 6, which rests upon the edge 2 of the main recipient, to hold said milk recipient, at a suitable distance from the bottom of the said recipient, thus leaving a water space 7 around its sides and bottom. The said milk recipient is circular in shape and has provided in the bottom a central hole and an upright tubular wall 8 forming an upright central water space 9 communicating with the space 7, said tubular wall extending preferably to the upper edge of the said milk recipient.

Said milk recipient is provided with a removable cover 10 having a central hole 11 registering with the tubular central space 9 and 12 is a downward projecting flange provided around the hole and adapted to engage into said space 9. A cover 13 is provided over said central hole 11, in which may be suitably mounted the thermometer 14, which projects into said water column or space 9 and by means of which it is possible to determine the exact temperature of the water. A similar thermometer 15 may be also mounted into the cover 10, which preferably projects into the milk recipient to indicate the temperature of the milk.

On either side of the milk recipient may be provided rings or handles 16 by means of which the said recipient may be removed from the main water recipient 1.

In the operation of this device, the milk recipient 5 is filled with milk, by removing the cover 10. After this operation the cover is placed over same and the water recipient may be filled with water through the hole 11, which entirely surrounds the milk, except at the top. The cover 13 is then replaced and the device is heated until the temperature of approximately 145° or more has been attained. When this point or about, has been attained, it is removed from the stove and kept at this average temperature for thirty minutes, which is the time required for perfect pasteurization. After this, the treated milk is cooled by pouring cold water into the tubular space 9, the hot water being shoved-out through the outlet opening 4. By this means, it is possible to rapidly cool the milk.

What I claim as my invention is:—

A portable pasteurizer for milk comprising a main water recipient, a milk recipient mounted therein the main water recipient and supported at the upper end thereof with the lower ends of the two recipients spaced from each other, a top wall on the water recipient upon which the milk recipient is supported, the milk recipient including a central bore open at the bottom and providing a water column intermediate of said milk recipient communicating with said main water recipient, a cover for the milk recipient and water column, and said water recipient having an overflow adjacent its upper end whereby water may be introduced into the column and escape through the overflow.

In testimony whereof I affix my signature.

ALEXANDRE LESPÉRANCE.